United States Patent [19]

Stonehocker

[11] 4,043,077
[45] Aug. 23, 1977

[54] EXPANDABLE POT FOR CONTAINING PLANTS AND METHOD THEREFOR

[76] Inventor: Clara Francis Stonehocker, 10260 W. 12th Ave., Lakewood, Colo. 80215

[21] Appl. No.: 684,581

[22] Filed: May 10, 1976

[51] Int. Cl.² .............................................. A01G 9/02
[52] U.S. Cl. ........................................... 47/66; 47/71; 150/48; 206/423
[58] Field of Search ................ 47/34, 34.1, 34.2, 34.3, 47/34.4, 34.7, 35, 37, 1.2, 41.12, 69, 71-74, 77, 84, 66, 67; 150/.5, 44, 48, 50, DIG. 1; 206/423; 220/1.5

[56] References Cited

U.S. PATENT DOCUMENTS

| | | | |
|---|---|---|---|
| 1,648,570 | 11/1927 | White | 47/34 X |
| 2,123,075 | 7/1938 | Langa | 47/34 X |
| 2,858,647 | 11/1958 | Cotton | 47/37 |
| 2,956,370 | 10/1960 | Wieboldt | 47/1.2 |
| 3,180,055 | 4/1965 | Ferrand | 47/37 |
| 3,302,325 | 2/1967 | Ferrand | 47/37 |
| 3,744,183 | 7/1973 | Kato | 47/1.2 |
| 3,775,903 | 12/1973 | Pike | 47/37 |
| 3,888,042 | 6/1975 | Bourne | 47/37 |
| 3,943,661 | 3/1976 | Devito et al. | 47/34 A X |
| 3,961,444 | 6/1976 | Skaife | 47/34 X |
| 3,962,823 | 6/1976 | Zipperer | 47/37 |
| 3,962,825 | 6/1976 | O'Connell | 47/41.12 |
| 3,981,099 | 9/1976 | Dziewulski | 47/34 |

FOREIGN PATENT DOCUMENTS

| | | | |
|---|---|---|---|
| 15,550 | 7/1899 | United Kingdom | 47/35 |

Primary Examiner—Edgar S. Burr
Assistant Examiner—James R. Feyrer
Attorney, Agent, or Firm—Burton & Dorr

[57] ABSTRACT

An expandable pot for containing the roots of a plant is designed to expand primarily in response to the growth of the plant's roots. The sides of the pot are folded in an accordian-like manner which flexes outwardly to increase the volume of the pot in response to the growth of the roots therein. As the pot expands outwardly, additional soil is added into the pot in order to maintain the surface of the soil at a desired level. Formed beneath the expandable pot is a drain container and formed along the sides of the pot is a stop member for limiting the expansion of the pot to a predetermined volume.

5 Claims, 13 Drawing Figures

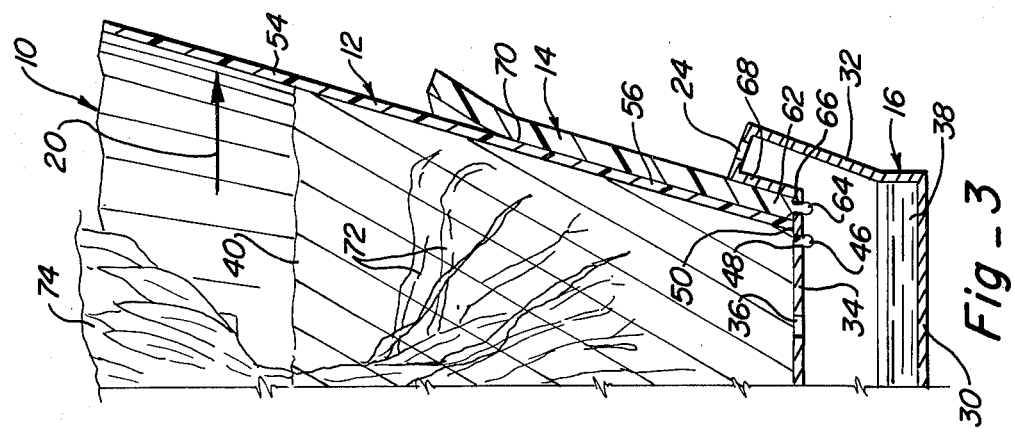
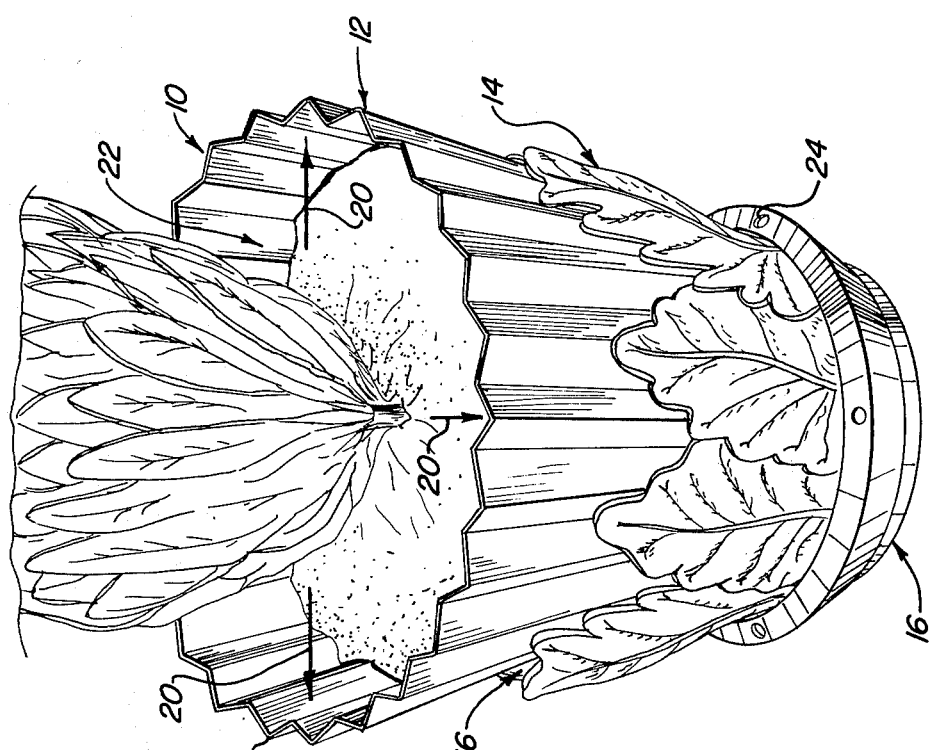
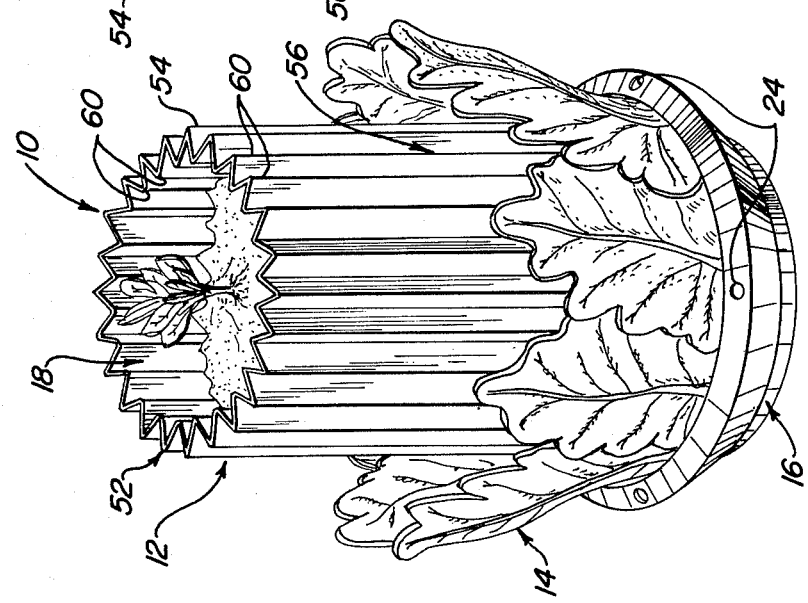

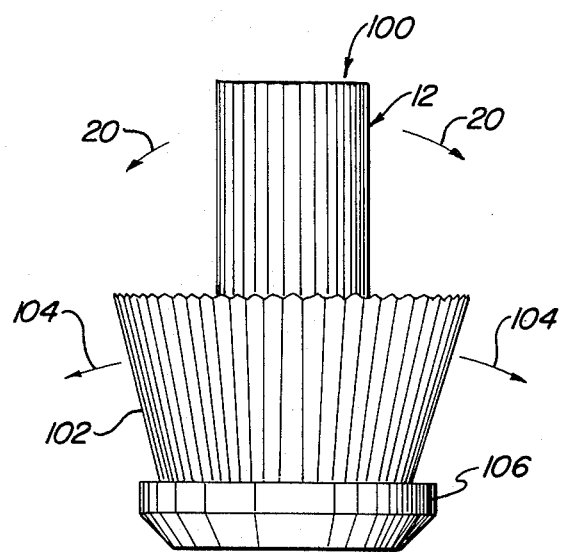
Fig_4
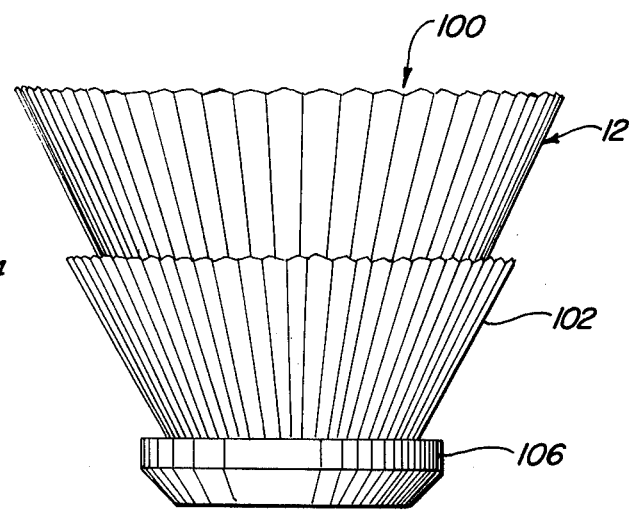
Fig_5
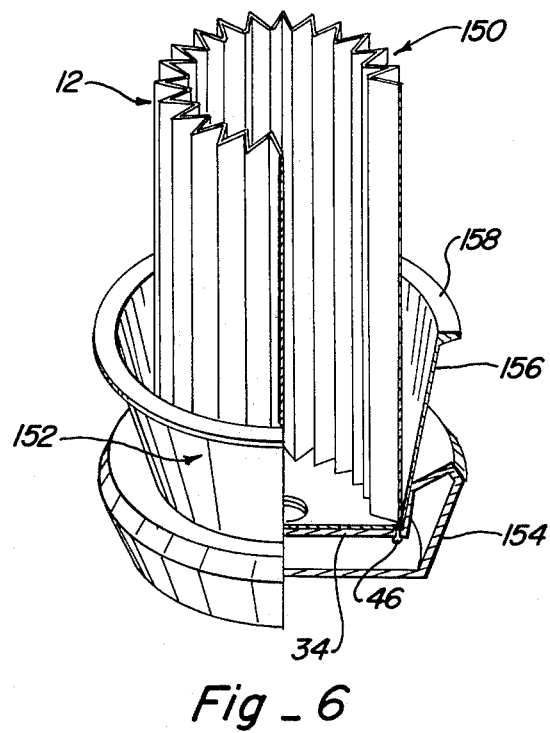
Fig_6
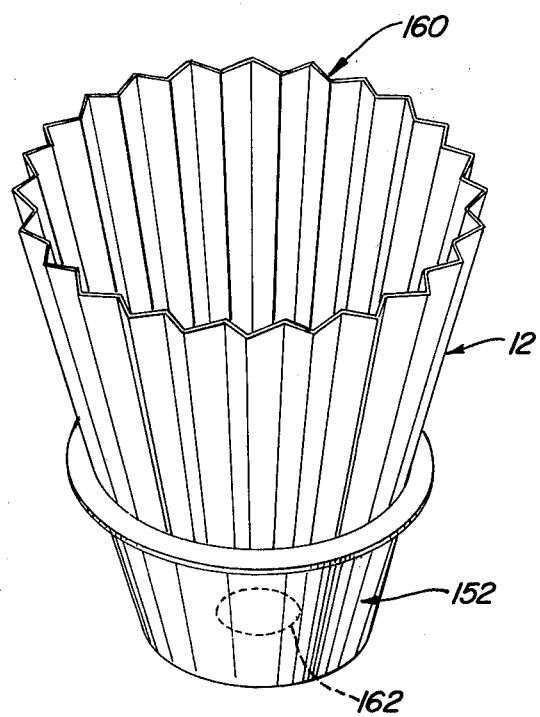
Fig_7

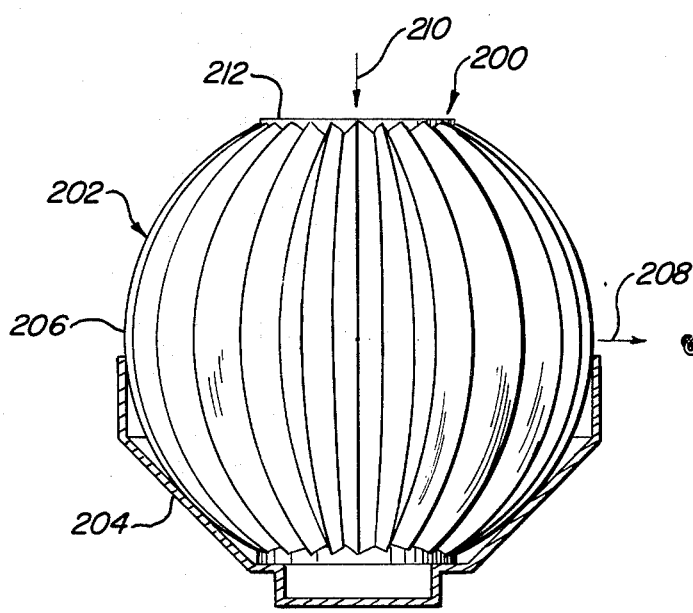
Fig_8
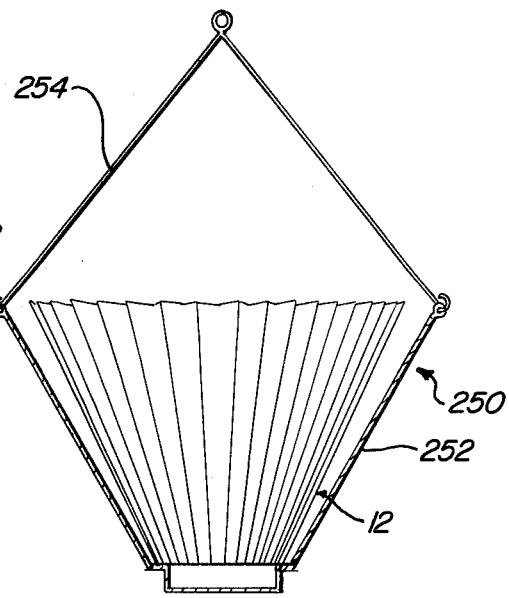
Fig_9
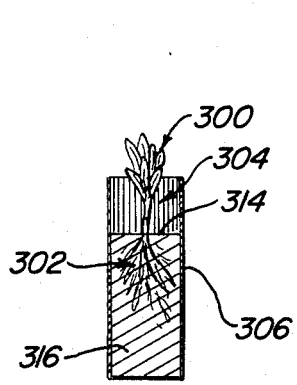
Fig_10
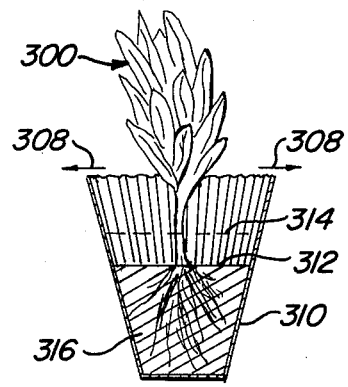
Fig_11
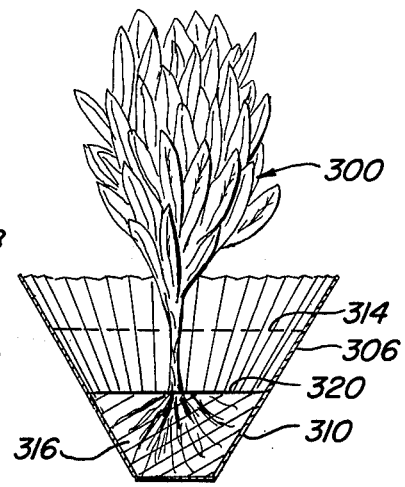
Fig_12
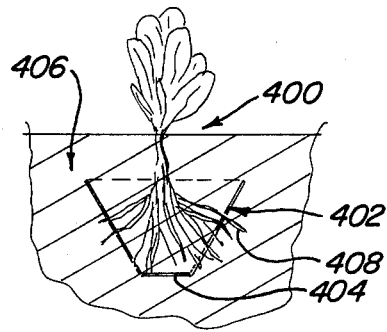
Fig_13

EXPANDABLE POT FOR CONTAINING PLANTS AND METHOD THEREFOR

BACKGROUND OF THE INVENTION

1. Field of the Invention

The present invention relates generally to pots for containing plants and more particularly to expandable flower pots primarily responsive to root growth for flexing outwardly.

2. Description of the Prior Art

Pots have long been in use for holding and containing the root ball of plants and for supporting plants in a primarily upright position. All such prior art pots, commonly termed "flower pots", have been manufactured from clay, plastic, or a similar type of durable strong material.

Recently, some prior art pots have been manufactured out of a less durable and, in fact, biodegradable material such as pressed peat moss so that the plant and the pot can be inserted into the soil as a unit whereupon the flower pot disintegrates in time allowing the roots of the plants to expand outwardly and into the soil.

The primary disadvantage of such prior art approaches is that numerous sized pots are necessary for transplanting the plant as the plant grows from a small size such as a seedling to a full grown plant. Often, for a typical house plant, three transplantings are necessary between the seedling stage and the full grown stage. The present invention eliminates the above stages of transplanting by providng a pot that is adaptable to the different stages of growth through use of flexible accordian-like sides which expands outwardly primarily with the growth of the roots. Additional soil can be selectively added to the plant during the different stages of growth. A further advantage over prior art approaches is that during the expansion of the pot of the present invention the soil loosens and becomes aerated thereby stimulating the growth of the plant. Such advantages over prior art approaches enable plants grown in the pot of the present invention to reach maturity without the normal retardation due to transplanting and, in fact, growth is accelerated due to the aeration of the soil. The use of a single pot from the seedling stage of a later more mature stage results in a low cost advantage over prior art approaches which require multiple pots.

OBJECTS OF THE INVENTION

It is an object of the present invention to provide a new and novel pot in which to grow plants.

It is another object of the present invention to provide a new and novel pot for containing the roots of a plant wherein the pot responds to the growth of the plant for expanding the holding volume of the pot.

It is still another object of the present invention to provide a new and novel pot for containing the roots of a plant which responds to the growth of the plant for expanding the holding volume of the pot to a predetermined volume.

It is still another object of the present invention to provide a new and novel pot for holding the roots of a plant responsive to the growth of the plant for expanding the holding volume of the pot to a predetermined volume wherein the means for limiting the expansion of the pot also comprises the means for suspending the pot in mid-air.

It is still another object of the present invention to provide a new and novel pot for containing the roots of a plant wherein the pot responds to the growth of the plant for expanding the holding volume of the pot and wherein a drain for collecting excess water from around the roots is disposed at the bottom of the pot.

It is still a further object of the present invention to provide a new and novel pot for containing the roots of a plant wherein the sides of the pot responds to the growth of the plant for expanding the holding volume of the pot and wherein the pot is made from a biodegradable material.

It is still a further object of the present invention to provide a new and novel method for growing plants having the steps of inserting a seed in a pot having expandable sides, repeatedly watering, selectively expanding the pot, and adding additional soil after each expansion.

SUMMARY OF THE INVENTION

The present invention comprises a new and novel pot having expandable sides which respond to the growth of the roots of the plant for flexing outwardly. In one configuration, a limit or stop is provided extending upwardly and angularly outwardly from the bottom of the pot in order to prevent the sides of the pot from expanding beyond a predetermined amount. In another configuration, the limit or stop is also expandable and when abutted by the expandable sides of the pot, causes the expansion of the sides to progress at a much slower rate. In yet another configuration, the expandable sides are shaped substantially in the form of a sphere wherein the mid-section of the sides exhibits the greatest amount of expansion.

The new and novel pot of the present invention may be made from plastic or similar durable material for long-lasting use in a conventional living space or it may be made from biodegradable material for use by a greenhouse or nursery for ease in transplanting the plant into the ground.

A drain container may be disposed and oriented below the expandable sides of the pot to collect any excess water from the interior of the pot. In addition, means for hanging the expandable pot may be provided extending upwardly from the bottom of the expandable sides.

A new and novel method is disclosed wherein an expandible pot is selectively expanded in response to growth of a plant contained therein and wherein soil is added after each such selective expansion.

Other objects, advantages and capabilities of the present invention will become more apparent as the description proceeds, taken in conjunction with the accompanying drawings.

DESCRIPTION OF THE DRAWINGS

FIG. 1 is a perspective view of one embodiment of the flexible pot of the present invention shown in the unexpanded state.

FIG. 2 is a perspective view of the pot of FIG. 1 in the expanded state.

FIG. 3 is a half-sectional view of the expanded pot of FIG. 2.

FIG. 4 is a side planar view of a second embodiment of the expandable pot of the present invention in the unexpanded state.

FIG. 5 is a side planar view of the pot of FIG. 4 in the expanded state.

FIG. 6 is a perspective view with a partial cut-away of a pot of the present invention in a third embodiment in the unexpanded state.

FIG. 7 is a perspective view of a pot similar to the pot of FIG. 6 in the expanded state but without a drain container.

FIG. 8 is a side planar view of the expandable pot of the present invention in yet a fourth embodiment having a substantially spherical shape.

FIG. 9 is a side planar view of the expandable pot interconnected in a hanging arrangement.

FIG. 10 is a diagrammatic illustration showing the roots of a plant in the pot of the present invention when the pot is in the unexpanded state.

FIG. 11 is a diagrammatic illustration of the plant of FIG. 10 as the plant's roots grow and cause the sides of the pot of the present invention to expand outwardly.

FIG. 12 is a diagrammatic illustration of the pot and plant of FIG. 11 in which the roots of the plant have fully expanded the sides of the pot of the present invention.

FIG. 13 is a diagrammatic illustration of the pot of the present invention being made of a biodegradable material that the roots of the plant break through the expandable sides and engage the soil.

DETAILED DESCRIPTION

The pot 10 of the present invention is shown in FIG. 1 to include expandable sides 12, angular side stops or limits 14, and a drain container 16. In a manner to be more fully described later, the root ball of a plant is inserted into the cavity 18 defined on the interior of the flexible side walls 12. As the roots of the plant expand and additional soil is added to the interior 18 of the pot 10, the sides 12 expand outwardly in the direction of arrows 20 as shown in FIG. 2. The expandable sides 12 are prevented from further expansion by their abutment against the limits or stops 14. It is apparent that at this time the pot 10 has a new volume defined by cavity 22. It is obvious that the volume of cavity 22 is predetermined by means of fixing the angle of the limits or stops 14 in relation to vertical and that the newly defined volume of cavity 22 is substantially greater than the volume of cavity 18 of the pot shown in FIG. 1.

The drain container 16 is suitably designed to receive excess water from the soil in the cavity defined by the flexible side walls 12 and to provide evaporation holes 24 from which the water can evaporate.

In FIG. 3, the details of the construction of the flexible pot 10 shown in FIGS. 1 and 2 are given. The drain container 16 is molded preferably from plastic or the like into a configuration having a substantially flat bottom portion 30, substantially vertical sides 32, and a depressed region 34 which is receptive partially of the flexible sides 12. Formed in the drain container 16 are a plurality of drain holes 36 which receive excess water 38 from the soil 40. Also formed in the drain container 16 are a plurality of evaporation holes 24 through which the collected excess water 38 can evaporate and dissipate into the atmosphere on the exterior of the pot 10.

In the preferred embodiment, the sides 12 have formed at their lower end male knobs or nubs 46 which, through snap action, engage correspondingly formed holes 48 in the depressed cavity region 34 of the drain container 16. Disposed around the bottom surface 50 of the flexible sides 12 are a plurality of interconnecting knobs or nubs 46 as well as a plurality of correspondingly formed receiving holes 48.

The flexible sides 12 are molded in an accordian-like fashion into a plurality of folds 52. The sides 12, for example, may be molded from plastic into the shape shown in FIG. 2. The bottom end 56 of flexible sides 12 in both the unexpanded and the expanded states remain in substantially the same position due to the engaging relationship of the bottom 56 to sides 12 with the drain container 16. The flexible sides 12 may be molded from plastic material or the like so that the region near the apex 60 of each fold 52 is what is conventionally termed a living hinge—i.e. that despite constant flexing, the region of maximum stress which is the apex 60 of the material, remains in tact through repeated flexing. The sides 12 are therefore molded in an accordian-like fashion with the male knobs or nubs 46 on the bottom surface 50 at a plurality of locations and conveniently, in assembly of the expandable flower pot 10 of the present invention, snap into place in corresponding receiving holes 48 formed in the depressed cavity region 34 of the drain container 16.

The substantially angular stops or limits 14 which in FIGS. 1 and 2 are shown to comprise a plurality of preformed shaped leaves are also molded as a unit to have at the bottom surface 62 a plurality of male knobs or nubs 64 which engage a plurality of corresponding receiving holes 66 formed in the cavity surface 34 of the drain container 16. As with the flexible sides 12, the angular stops 14 as a unit snap into place, during assembly of the expandable flower pot 10, and form a press-fit engagement with the bottom end 56 of the expandable sides 12 and the angular upstanding sides 68 of the drain container 16. Therefore, the angular stops or limits 14 are firmly attached to the bottom end of the expandable flower pot engaging the bottom end of expandable sides 12 and the drain container 16. The stops 14 are of sufficient thickness and strength to effectively prohibit further movement of the expandable sides 12 in the direction of arrows 20 when the expandable sides 12 abuts the inner surface 70 of the stop 14. As mentioned previously, the roots 72 of a plant 74 disposed on the interior of the pot causes the expandable sides to expand outwardly in the direction of arrow 20 to abut the stops 14.

It is to be expressly noted that any of a number of conventional approaches may be utilized by a skilled mechanic in the manufacture of the pot 10 of the present invention with regards to providing means for interconnection between the stop 14 and the drain container 16 and the flexible sides 12 of the drain container 16. Indeed, it may be entirely possible that the entire pot 10 may be injection molded as a unit. Furthermore, the use of folded accordian-like sides 12 which expand outwardly in the direction of arrows 20 is preferable arrangement and under the teachings of this invention, any other suitable means for flexing outwardly in the direction of arrow 20 in response to the growth of the roots 72 of plant 74 finds application. In addition, the specific aesthetic design of stops 14 in the form of artistic leaves is a preferable design and may take on any of a plurality of conventional or imaginative shapes. The disclosure in FIGS. 1 through 3 is a preferable arrangement only and is by no means intended to limit or delimit the scope of this invention, as witnessed by the following embodiments.

In FIG. 4, the pot 100 of the present invention differs from the pot 10 shown in FIG. 1 in that the limit or stop 102 is also flexible and capable of expanding outwardly in the direction of arrows 104. As illustrated in FIG. 5, as the flexible sides 12 expand outwardly in the direction of arrows 20 to abut the flexible stop or limit 104, and thereby causing the limit 104 to move outwardly in the direction of arrows 104 to a maximum position as shown in FIG. 5. Through use of this approach, the cavity internal to the sides 12 of pot 100 is of much greater volume than the cavity 22 internal to the pot 10 shown in the expanded state of FIG. 2. As before, the flexible limit or stop member 102 can be manufactured from the same type of material as previously discussed for flexible sides 12. In addition, the pot 100 may also be provided with a suitable drain container 106.

In FIG. 6, is shown yet another pot 150 of the present invention which utilizes sides 12 in the same manner as previously discussed but differs from the prior art approaches in that the limit or stop member 152 is substantially cup-shaped and may be integrally molded with the drain container 154. It is to be noted that the limit or stop 152 may be molded separately from the drain container 154 and glued or otherwise affixed into place as shown in FIG. 6. In this embodiment, the limit or stop 152 has substantially linear sides 156 with a protruding upper lip or flange 158. As before, the flexible sides engage the cavity portion 34 of the drain container with an interlocking male knob or nub 46.

FIG. 7, illustrates yet another pot 160 of the present invention very similar to the configuration of FIG. 6 in that it uses flexible sides 12 and the cup-shaped limit or stop 152 but does not incorporate a drain container for the collection of excess water. Numerous conventional flower pots do not have provision for a drain container but are merely provided with a hole in the bottom to allow excess water from the soil surrounding the root ball of the plant to drain out. In this embodiment, a drain hole 162 is provided in the bottom surface of cup-shaped limit or stop 152. While it is preferable to have the provisions of a drain container affixed onto the pot of the present invention, as in the previous embodiments, it is evident that the pot arrangement 160 shown in FIG. 7 can be suitably adapted to fit into a conventional clay or plastic drain tray that is commercially available.

In FIG. 8 is shown yet another pot 200 of the present invention which utilizes a substantially spherical-shaped side configuration 202 and stops or limits 204 similar to those previously discussed. The flexible sides 202 have a mid-region portion 206 which expand outwardly in the direction of arrow 208, the top 212 travels slightly downward in the direction of arrow 210. The diameter of the opening at the top 212 since most of the expansion of the side portions 206 occurs in the direction of arrow 208 remains substantially constant.

In FIG. 9, is shown an expandable pot 250 of the present invention further including extended stop or limit portions 252 which extend to a portion above the surface of the expandable sides 12 so that twine or similar hanging material 254 may be used to hang the pot of the present invention in mid-air. This hanging pot arrangement can be adopted to any of the prior embodiments of the present invention by providing to those prior embodiments an extendable portion 252 to which the hanging rope 254 attaches.

The operation of the present invention is shown in FIGS. 10 through 12. In FIG. 10, a plant 300 has its root ball 302 inserted into the cavity region 304 defined by the flexible sides 306 of the present invention. Primarily through repeated waterings and through the growth of the plant, the sides 306 move outwardly in the direction of arrows 308 to abut a limit or stop 310. Occasionally, it may be necessary to manually expand the sides of the pot in order to provide a uniform expansion. At this point, the level of the soil 312 is substantially lower than the level of the soil 314 shown in FIG. 10. The original soil 316 has moved downwardly in the pot due to the increased volume of the pot and due to the effect of the sides expanding outwardly in the direction of arrows 308. At this point, soil is added to the configuration shown in FIG. 11 to return the soil to the original level of 314. It is to be noted that at this time not only can the appropriate soil be added, but also any other plant nutrient substances. As the plant 300 continues to grow, the roots or manual pressure force the flexible sides 306 fully against the limit or stop 310 so that further movement of the sides is prevented. Once again through repeated waterings and through the growth of the plant, the soil level obtains a new level of 320 which is disposed below the desired level of 314 shown in FIG. 11. At this time, additional soil is added to bring the level of the soil back up to the original level of 314. It is to be expressly understood that the sequence of steps described in FIGS. 10 through 12 depict a pot that responds primarily to the growth of the plant primarily through pressure of the roots on the side and pressure of repeated waterings to expand the pot outwardly to abut a limit or stop thereby increasing the volume of space around the root ball so that at periodic intervals new soil or nutrients can be added to the interior of the pot. It is obvious that this approach eliminates a common problem of transplanting. What has been described replaces approximately three stages of transplanting in a typical house plant. Those skilled in the art of gardening realize that with each transplant the plant usually undergoes severe stress, retardation of growth, and may, in fact, die. The teachings of this invention as shown in FIGS. 10 through 12 graphically portray the elimination of these transplanting steps to provide a plant of increased vigor and health. In addition, as the sides of the pot of the present invention expand outwardly the soil becomes aerated and enables the plant to grow at a faster rate.

In FIG. 13, is shown yet another embodiment 400 of the flower pot of the present invention. In this embodiment, the flexible sides 402 are preferably made from pressed or compressed peat moss or other natural fibrous material that is biodegradable. The flexible sides are conventionally attached to a bottom circular portion 404 also made from biodegradable material. There is no provision of stops or limits to the expansion of the flexible sides and there is no provision for a drain container. In this embodiment, a seed may be planted in the container 400 in the collapsed stage as shown in FIG. 10 and as the plant grows corresponding to the steps in FIGS. 10, 11 and 12, the sides expand outwardly thereby obviating the necessity for transplanting to a larger pot. When it is desired to transplant the plant into the soil 406, the entire biodegradable flexible pot 400 with plant can be inserted into the ground as a unit. The roots of the plant 408 break through the sides to engage the soil 406. The primary advantage of this approach is that all steps of transplanting have been completely eliminated.

It is to be expressly understood that the above-described embodiments are not meant to limit or delimit the scope of this invention as found in the appended claims. It is to be expressly understood that the aforementioned embodiments can be of any physical size adaptable for the smallest of plants to trees. In addition, it is to be expressly understood that the flexible sides can be made from plastic or similar material and that the specific accordian-like shape described to provide the flex in the sides is preferable and may encompass any other means for flexing outwardly primarily in the response to growth of plants. Therefore, although the present invention has been described with a certain degree of particularity, it is understood that the present disclosure has been made by way of example and that changes in details of the structure may be made without departing from the spirit thereof.

I claim:

1. A portable container for holding the roots of a plant, said container comprising:
    a bottom surface,
    flexible side walls attached at one end to said bottom surface, said flexible side walls being open at the end opposing said attached end and being responsive to the growth of said roots for flexing outwardly, said open end being of greater diameter upon expansion than said attached end,
    means cooperative with said flexible side walls for stopping the expansion of said container at a predetermined volume in said container, said stopping means including means cooperatve with said flexible side walls for slowing the rate of said expansion prior to said stopping, and
    means attached to said bottom surface for collecting excess water in said container.

2. A container for containing all of the roots of a plant, said container comprising:
    a circular bottom surface,
    sides formed from accordian-shaped material attached around the edge of said bottom surface at one end, said sides being open at the end opposing said attached end and beng responsive to the growth of said roots for flexing outwardly, said open end being of greater diameter upon expansion than said attached end, and
    means attached to said circular bottom surface cooperative with said sides for stopping the expansion of said pot at a predetermined volume in said pot.

3. The container of claim 2 in which said stopping means surrounds said sides.

4. A receptacle for containing all of the roots of a plant, said receptacle comprising:
    a bottom surface,
    flexible side walls attached at one end to said bottom surface, said flexible side walls being open at the end opposing said attached end and being responsive to the growth of said roots for flexing outwardly, said open end being of greater diameter upon expansion than said attached end,
    means cooperative with said flexible side walls for stopping the expansion of said container at a predetermined volume in said receptacle, said stopping means surrounding said sides and attached to said bottom surface,
    means attached to said bottom surface for collecting excess water in said receptacle, and
    said stopping means including means cooperative with said flexible side walls for slowing the rate of said expansion prior to said stopping.

5. A method for growing plants, said method comprising the steps of:
    inserting a seed in a cylindrical container having expandable flexible sides attached to a bottom wall, said container containing soil and nutrients,
    repeatedly watering said seed in said container until said seed sprouts and grows into said plant,
    selectively expanding the flexible sides of said container to increase the volume of said container in response to the growth of said plant, and
    adding additional soil and nutrients to said container after each selective expansion.

* * * * *